(12) United States Patent
Juvan (10) Patent No.: US 8,372,166 B2
(45) Date of Patent: *Feb. 12, 2013

(54) PLASMA ASSISTED GASIFICATION SYSTEM

(75) Inventor: Christian H. A. Juvan, Cupertino, CA (US)

(73) Assignee: AdaptiveARC, Inc., San Jose, CA (US)

( * ) Notice: Subject to any disclaimer, the term of this patent is extended or adjusted under 35 U.S.C. 154(b) by 268 days.

This patent is subject to a terminal disclaimer.

(21) Appl. No.: 12/946,522

(22) Filed: Nov. 15, 2010

(65) Prior Publication Data

US 2012/0117876 A1 May 17, 2012

(51) Int. Cl.
*C10J 1/207* (2006.01)

(52) U.S. Cl. ............. 48/76; 48/61; 48/73; 48/77; 48/63; 48/101; 48/107; 48/102 A; 48/111; 48/95; 422/906; 373/18

(58) Field of Classification Search ................ 48/76, 61; 422/906; 373/18
See application file for complete search history.

(56) References Cited

U.S. PATENT DOCUMENTS

| | | | |
|---|---|---|---|
| 4,266,180 A | 5/1981 | Juvan | |
| 4,917,785 A | 4/1990 | Juvan | |
| 4,957,606 A | 9/1990 | Juvan | |
| 5,026,484 A | 6/1991 | Juvan | |
| 5,037,524 A | 8/1991 | Juvan | |
| 6,117,401 A | 9/2000 | Juvan | |
| 6,250,236 B1 * | 6/2001 | Feizollahi | 110/346 |
| 7,452,392 B2 * | 11/2008 | Nick et al. | 48/198.1 |
| 2003/0171635 A1 * | 9/2003 | Bereczky et al. | 588/212 |
| 2008/0147241 A1 * | 6/2008 | Tsangaris et al. | 700/273 |
| 2008/0222956 A1 * | 9/2008 | Tsangaris et al. | 48/77 |
| 2010/0266908 A1 * | 10/2010 | de Graffenried, Sr. | 429/416 |
| 2011/0162278 A1 * | 7/2011 | DePuy et al. | 48/62 R |

* cited by examiner

*Primary Examiner* — Kaity V. Handal
(74) *Attorney, Agent, or Firm* — Akerman Senterfitt; Michael K. Dixon (57) ABSTRACT

A controlled zone gasification reactor for a plasma assisted gasification reaction system is disclosed for converting fuel, such as, but not limited to, biomass, to syngas to replace petroleum based fuels used in power generation. The system may be a modular system housed within a frame facilitating relatively easy transportation. The system may include a reactor vessel with distinct reaction zones that facilitate greater control and a more efficient system. The system may include a syngas heater channeling syngas collected downstream of the carbon layer support and to the pyrolysis reaction zone. The system may also include a syngas separation chamber configured to produce clean syngas, thereby requiring less filtering. The system may further include an agitator drive assembly that prevents formation of burn channels with in the fuel.

22 Claims, 9 Drawing Sheets

PLASMA ASSISTED GASIFICATION SYSTEM

FIELD OF THE INVENTION

The invention relates in general to gasification systems and, more particularly, to gasification systems capable of using waste products as fuel to form clean synthetic gas (syngas) that is useful for power generation.

BACKGROUND OF THE INVENTION

Gasification systems have been used for power generation by converting biomass fuel sources into combustible gases that contain nearly all of the energy of the biomass. The gasification systems convert carbonaceous materials, such as coal, biomass, biofuel, carbon dioxide, hydrogen and petroluem, into charcoal, wood-oils, and tars using both combustion and pyrolysis with a controlled amount of oxygen or steam. The gasification systems produce syngas, which is used as a fuel within engines, such as internal combustion engines and turbine engines. Syngas may be combusted at higher temperatures than other fuels courses, thereby making internal combustion of syngas potentially more efficient than other fuel sources.

A challenging aspect of using gasification systems for power generation from waste fuel sources is efficiently producing power while handling the waste products developed within the systems. The highly efficient method of converting syngas to electric power is offset by power consumption in waste fuel preprocessing and gas cleaning. The gasification byproducts including tars must be filtered from the syngas before the syngas can be burned in an engine, otherwise, the life of the engine will be greatly shortened.

Gasification systems used for power generation systems typically have a large footprint, such as an acre or more, and are typically constructed on-site. As such, skilled tradesman are required to construct and often to operate such a gasification system, which limits the locale in which the conventional gasification systems may be constructed efficiently. The costs associated with constructing and operating conventional gasification systems in remote locales often outweighs the benefit of the power generated. Thus, a gasification system is needed that produces syngas efficiently with few contaminants and overcomes the challenges of remote site construction and operation.

SUMMARY OF THE INVENTION

A plasma assisted gasification system having a controlled zone gasification reactor is disclosed for converting fuel, such as, but not limited to, biomass, to electricity. The gasification system can create electricity from biomass by producing syngas to replace the need for petroleum based fuels to engines, such as, but not limited to, diesel engines and turbine engines. The engines may operate at least partially on the syngas supplied by the syngas separation chamber. The gasification system may be a modular system housed within a frame facilitating relatively easy transportation. The gasification system may be a modular syngas powered power generation system that facilitates easy shipment over land, sea, rail, or air, including being air dropped to any destination. The frame may have any appropriate configuration necessary to facilitate transportation of the system from manufacturing site to on-site location and between operation sites.

The plasma assisted gasification system may include a reactor vessel having at least one fuel inlet, a pyrolysis reaction zone, a combustion reaction zone and a carbon layer support, wherein the pyrolysis reaction zone may be positioned above a combustion reaction zone, and the combustion reaction zone may be positioned above a carbon layer support. The pyrolysis reaction zone may be positioned between an inner surface of the reactor vessel and an outer surface of a conduit forming a fuel inlet, whereby the pyrolysis reaction zone may include at least one plasma torch. The pyrolysis reaction zone may include a downstream shield extending at least partially from an inner surface of the reactor vessel towards the conduit forming the fuel inlet. The combustion reaction zone may be defined by at least one rotatable burner on an upstream side of the combustion reaction zone, wherein the rotatable burner is configured to rotate within the reactor vessel to reduce the formation of burn channels in fuel held in the reactor vessel. The use of the burners define the combustion reaction zone. The reactor vessel may also include an ash collection zone positioned downstream from the carbon layer support.

The system may also include an engine, which may be, but is not limited to being, a turbine engine and a diesel engine, that operates at least partially on the syngas supplied by the syngas separation chamber and an electric generator in communication with the engine and configured to generate electricity from rotational movement of components of the engine. The gasification system may include a syngas heater channeling syngas collected downstream of the carbon layer support and to the pyrolysis reaction zone.

The gasification system may also include an impure syngas recycler positioned in the reactor vessel for routing syngas together with contaminants from a region downstream of the carbon layer support to the combustion reaction zone. The syngas recycler may be formed from a syngas separation chamber and at least one burner. The syngas separation chamber may be positioned within the reactor vessel to separate contaminants created during combustion in the combustion chamber from the syngas. The gasification system may also include a syngas recycler positioned in the reactor for routing syngas together with contaminants from a region downstream of the carbon layer support to the combustion reaction zone. The syngas recycler may include a turbine positioned within a turbine assembly upstream from the syngas separation chamber such that during operation separates syngas from contaminants in the syngas such that the contaminants are located near an outer wall defining the syngas separation chamber and relatively uncontaminated syngas is located closer to a longitudinal axis of the syngas separation chamber. Contaminated syngas may be passed to the burners of the agitator drive assembly, where the contaminants are burned. The turbine assembly may be formed from a plurality of sidewalls forming a chamber that extends from the carbon layer support to an outer wall forming the reactor vessel of the reaction chamber. At least one of the plurality of sidewalls may have at least one inlet therein.

The gasification system may include an agitator drive assembly positioned in the reactor vessel extending into the combustion reaction zone and defining at least a portion of the combustion reaction zone with one or more burners. The burner may be rotatable within the reactor vessel to prevent formation of burn channels within the fuel. The gasification system may include a plurality of rotatable burners that extend radially outward from an outer surface of the conduit forming a portion of the agitator drive assembly. In one embodiment, the burner may be rotated by rotating the agitator drive assembly. As such, the conduit forming a portion of the agitator drive assembly may also include a drive gear attached to a bottom portion of the agitator drive assembly and may be configured to drive the agitator drive assembly at a rotational speed of less than about two revolutions per minute. The gasification system may include a syngas separation chamber positioned in a hollow portion of the agitator drive assembly configured to separate contaminants from syngas such that syngas with contaminants are passed into the burner to remove the contaminants from the system. A vortex inducing device, such as, but not limited to a turbine, may be located upstream from the syngas separation chamber to create a high speed vortex sending contaminants in the syngas to the outer walls. The contaminants are routed to the through the burners to the combustion zone and the syngas is routed toward the engine.

The frame may be configured to form a trailer upon which at least a portion of, or the entirety of, the gasification system may be housed. In at least one embodiment, the frame may be a trailer sized and constructed in conformity with applicable laws such that the trailer may be pulled on public roadways. In at least one embodiment, components of the system, including, but not limited to, the reactor vessel, the engine, the generator, and the syngas filter may be positioned on the frame such that when the system is positioned in a stowed position, the components of the system are contained within the frame such that the frame may be towed on a highway without components being placed in risk of being destroyed. The frame may also be inserted into a fully enclosed shipping container. In at least one embodiment, the frame, in a stowed position, may have outer dimensions less than inner dimensions of standard 40 foot shipping container and therefore, may be configured to fit within a 40 foot long shipping container.

One or more of the plasma torches may be positioned such that an exit of the plasmas torch is directed partially radially inward, nontangential and nonradial in a plane orthogonal to a longitudinal axis of the reactor vessel, and may be positioned in a downstream direction nonparallel to the longitudinal axis, thereby, during use, forming a helical pathway of pyrolysis gas, during use, within the fuel contained in the reactor vessel. The plasma torch may be positioned in a downstream direction nonparallel to the longitudinal axis such that the plasma torch is positioned between about five degrees and 20 degrees from a plane orthogonal to the longitudinal axis of the reactor vessel.

The gasification system may include an agitator drive assembly positioned in the reactor vessel extending into the combustion reaction zone and defining at least a portion of the combustion reaction zone with one or more burners. The burner may be rotatable within the reactor vessel to prevent formation of burn channels within the fuel. The gasification system may include a plurality of rotatable burners that extend radially outward from an outer surface of the conduit forming a portion of the agitator drive assembly. In one embodiment, the burner may be rotated by rotating the agitator drive assembly. As such, the conduit forming a portion of the agitator drive assembly may also include a drive gear attached to a bottom portion of the agitator drive assembly and may be configured to drive the agitator drive assembly at a rotational speed of less than about two revolutions per minute. The gasification system may include a syngas separation chamber positioned in a hollow portion of the agitator drive assembly configured to separate contaminants from syngas such that syngas with contaminants are passed into the burner to remove the contaminants from the system.

A syngas exhaust conduit may be positioned within the agitator drive assembly and may have an inlet positioned upstream from an inlet to the burner, whereby the inlet to the syngas exhaust conduit may be positioned radially inward from inner walls forming the syngas separation chamber and the inlet to the at least one burner may be positioned radially outward from the syngas exhaust conduit. In such a position, syngas free of contaminants may be passed through the syngas exhaust conduit to an engine, and the syngas containing contaminants may be sent to the burner to be recycled to remove the contaminants. In at least one embodiment, the agitator drive assembly may include a plurality of burners that extend radially outward from an outer surface of the conduit forming a portion of the agitator drive assembly. The agitator drive assembly may also include one or more ambient air supplies that includes an outlet in direct fluid communication with the burners upstream from the burner outlet. Air may be supplied to the combustor chamber if needed.

The gasification system may also include a fuel dryer in communication with and positioned upstream from the plasma assisted gasification reaction chamber. The fuel dryer may be positioned upstream from the fuel inlet to the reactor vessel. An exhaust gas inlet in the dryer may place an exhaust from the engine in fluid communication with the fuel dryer such that exhaust gases may be passed to the dryer to dry the fuel. The fuel inlet to the reactor vessel may be sealed with fuel positioned in the fuel inlet and exhaust gases from the engine. The gasification system may also include a fuel shredder in communication with and positioned upstream from the fuel dryer to shred the fuel before being feed to the fuel inlet.

The gasification system may also include one or more syngas filters in fluid communication with the plasma assisted gasification reactor vessel and positioned downstream from the carbon layer support and upstream of the engine. In one embodiment, the syngas filter may be formed from a water based scrubber that quickly quenches the syngas after formation to limit the formation of NOx and to remove other contaminants before being injected into an engine.

The gasification system may also include a syngas heater for heating the syngas before being passed to the engine. In at least one embodiment, the syngas heater may be positioned in the pyrolysis reaction zone such that heat from the pyrolysis reaction zone heats syngas flowing through the syngas heater. The syngas heater may be formed from at least one conduit in direct fluid communication with the syngas collection chamber between the carbon layer support and the ash collection zone. The conduit forming the syngas heater may be formed from a conduit that is positioned at least in part radially outward from a fuel inlet conduit forming at least a portion of the at least one fuel inlet of the reactor vessel. The conduit forming the syngas heater may have at least one outlet in the pyrolysis reaction zone such that the syngas is exhausted into the pyrolysis reaction zone. The syngas heater conduit may be formed from at least one exhaust conduit having a support bearing that bears on an outer surface of the fuel inlet conduit forming at least a portion of the at least one fuel inlet of the reactor vessel. The syngas heater conduit may be rotatable about the outer surface of the fuel inlet conduit. In at least one embodiment, the syngas heater conduit may be coupled to the agitation device assembly and may thus be rotatable.

An advantage of the gasification system is that household rubbish may be used as shredded fuel to create syngas, thereby reducing the diesel fuel consumption in power generation by up to 90 percent and eliminating rubbish with minimal contaminant discharge in the air.

Another advantage of this system is that the gasification system substantially reduces contaminates in the syngas that is produced, thereby producing a syngas that requires less filtering and is more readily usable in an engine without requiring extensive filtering.

Yet another advantage of this system is that the gasification system produces syngas with fewer contaminates, thereby resulting in less contamination buildup in an engine in which syngas is used.

Another advantage of this invention is that the syngas heater increases the efficiency of the engine without negatively impacting the reactor vessel.

These and other advantages can be realized with a system in accordance with aspects of the invention.

DETAILED DESCRIPTION OF EMBODIMENTS OF THE INVENTION

Aspects of the present invention relate to gasification components, systems and associated methods that can enhance the performance of a plasma assisted gasification system. Embodiments according to aspects of the invention are shown in FIGS. 1-10, but the present invention is not limited to the illustrated structure or application. Rather, the following detailed description is intended only as exemplary.

Figure 1:
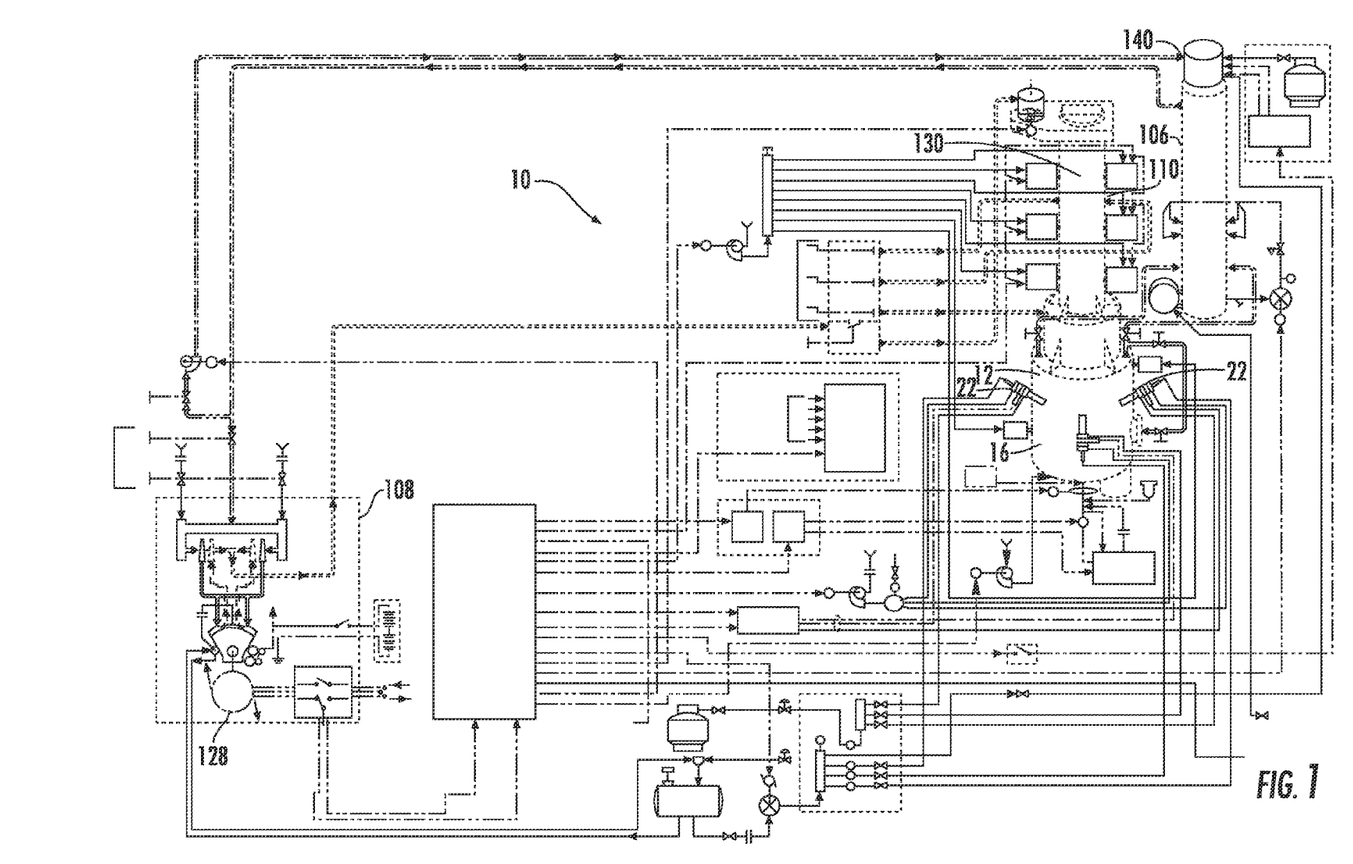
FIG. 1 is a schematic view of the plasma assisted gasification system.
Figure 7:
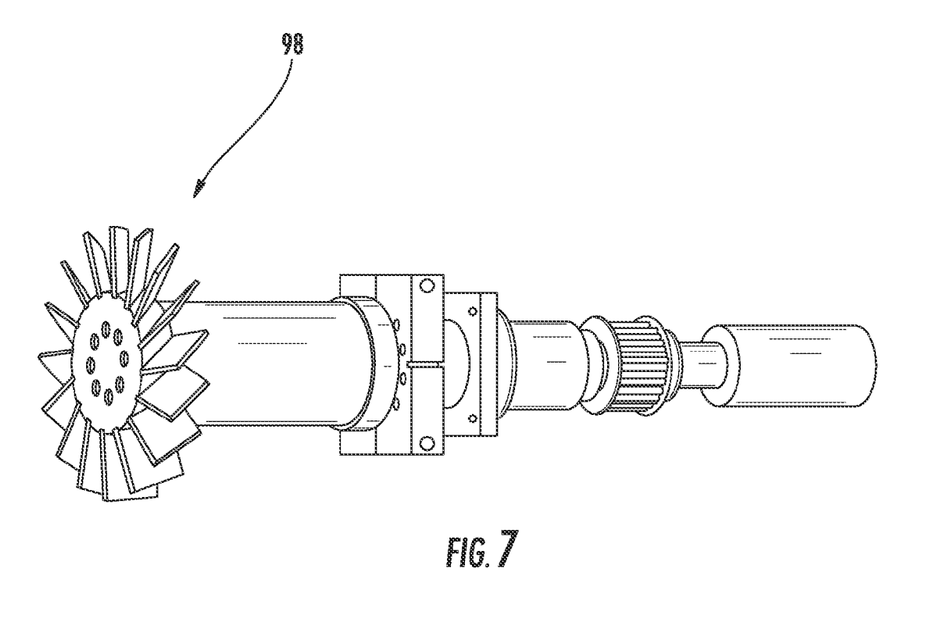
FIG. 7 is a perspective view of the turbine configured to be positioned within the turbine assembly in the agitator drive assembly.
Figure 8:
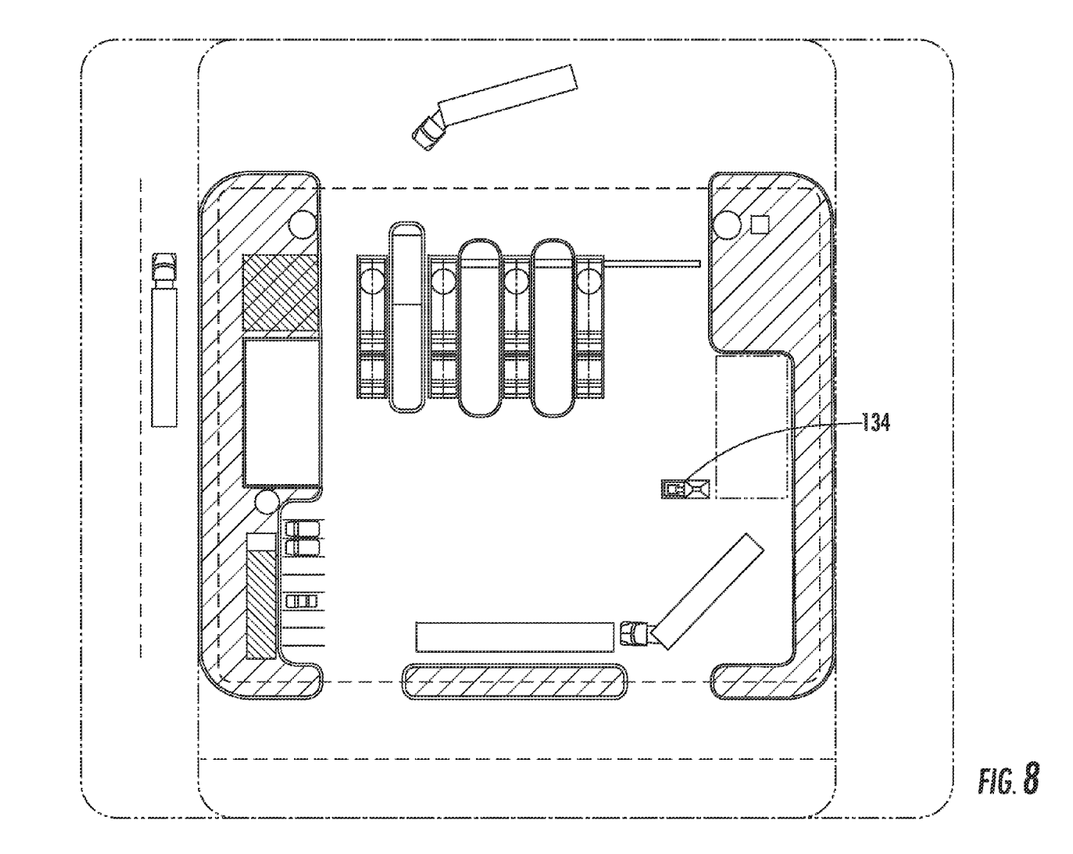
FIG. 8 is an exemplary site plan for the plasma assisted gasification system.
Figure 9:
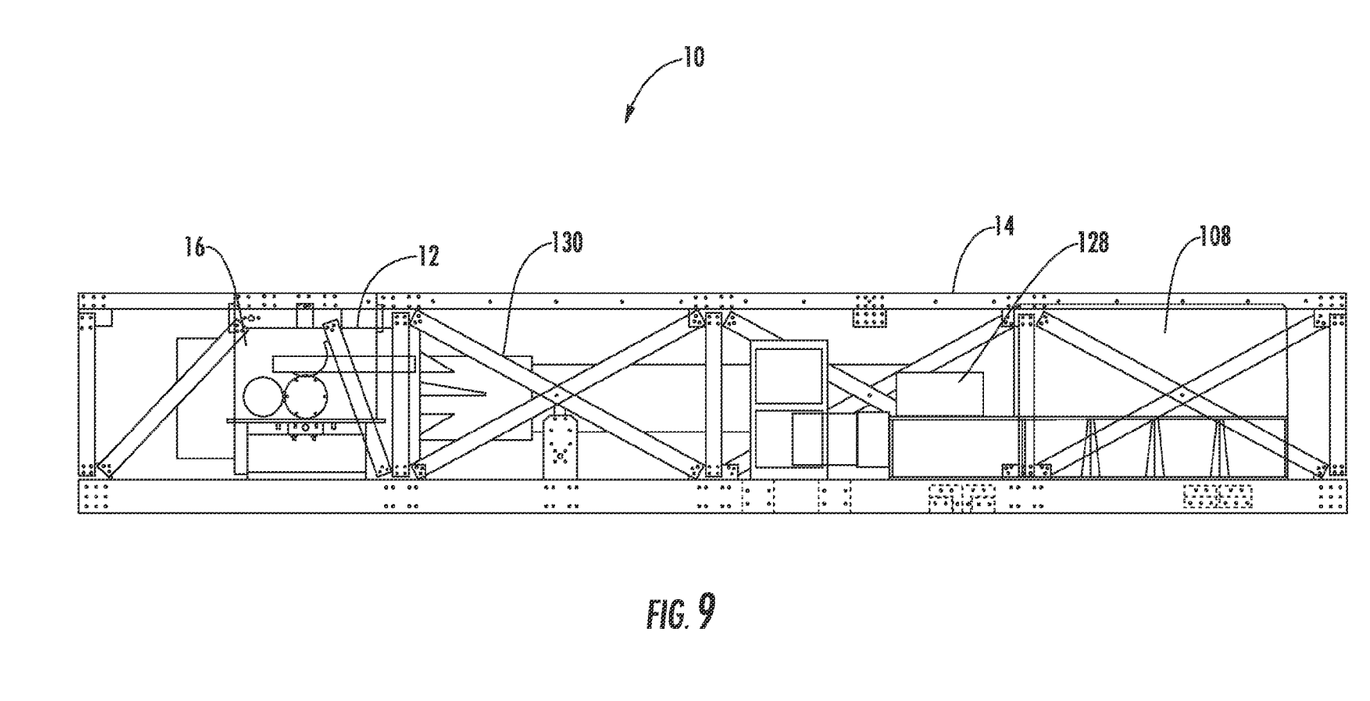
FIG. 9 is a side view of the plasma assisted gasification system in a stowed position.
Figure 10:
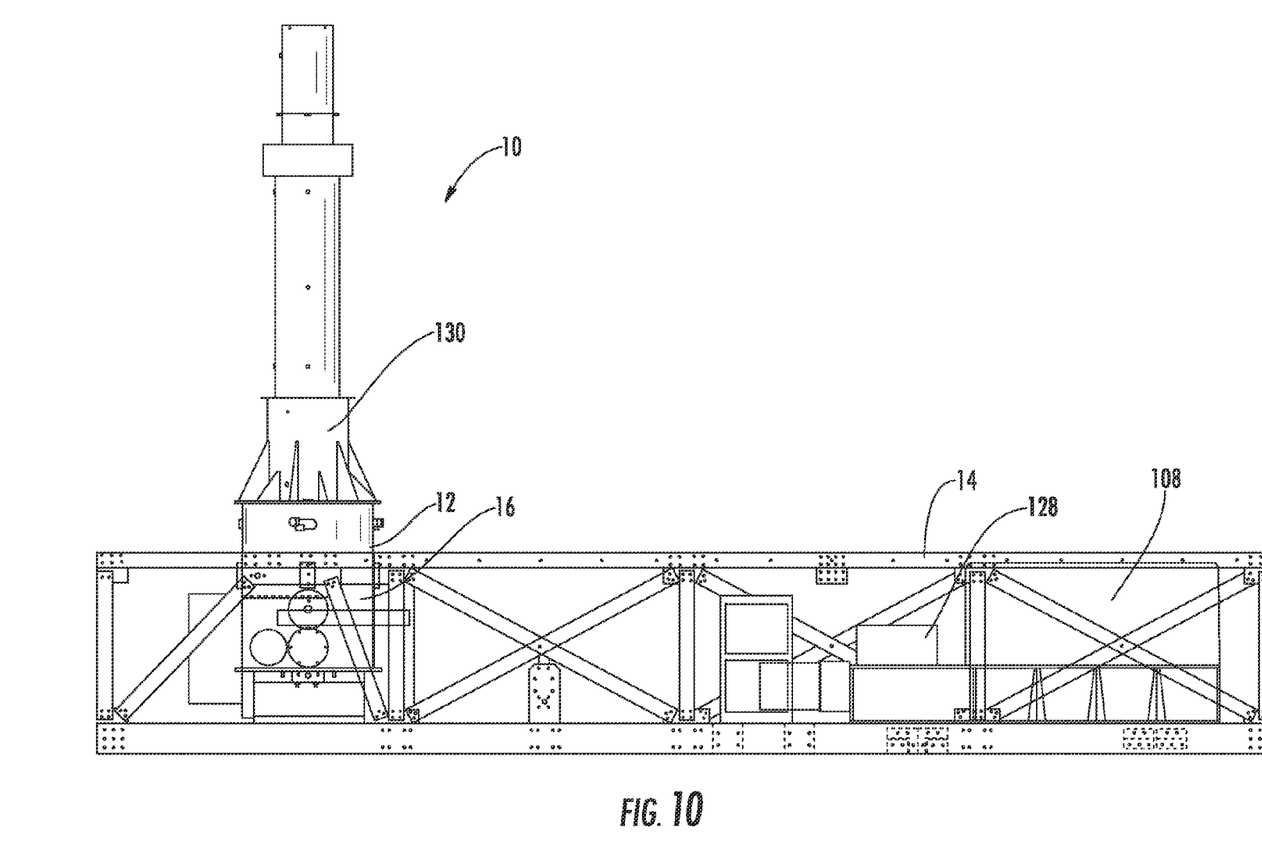
FIG. 10 is a side view of the plasma assisted gasification system in an operating position.

As shown in FIGS. 1-10, a plasma assisted gasification system 10 having a controlled zone gasification reactor 12 is disclosed for converting fuel 142, such as, but not limited to, biomass, to electricity. The gasification system 10 can create electricity from biomass by producing syngas to replace the need for petroleum based fuels to engines, such as, but not limited to, diesel engines and turbine engines 108. The engines 108, as shown in FIGS. 1, 9 and 10, may operate at least partially on the syngas supplied by the syngas separation chamber. The gasification system 10 may be a modular system housed within a frame 14 facilitating relatively easy transportation. The gasification system 10 may be a modular syngas powered power generation system 10 that facilitates easy shipment over land, sea, rail, or air, including being air dropped to any destination. The frame 14 may have any appropriate configuration necessary to facilitate transportation of the system 10 from manufacturing site to on-site location and between operation sites.

Figure 2:
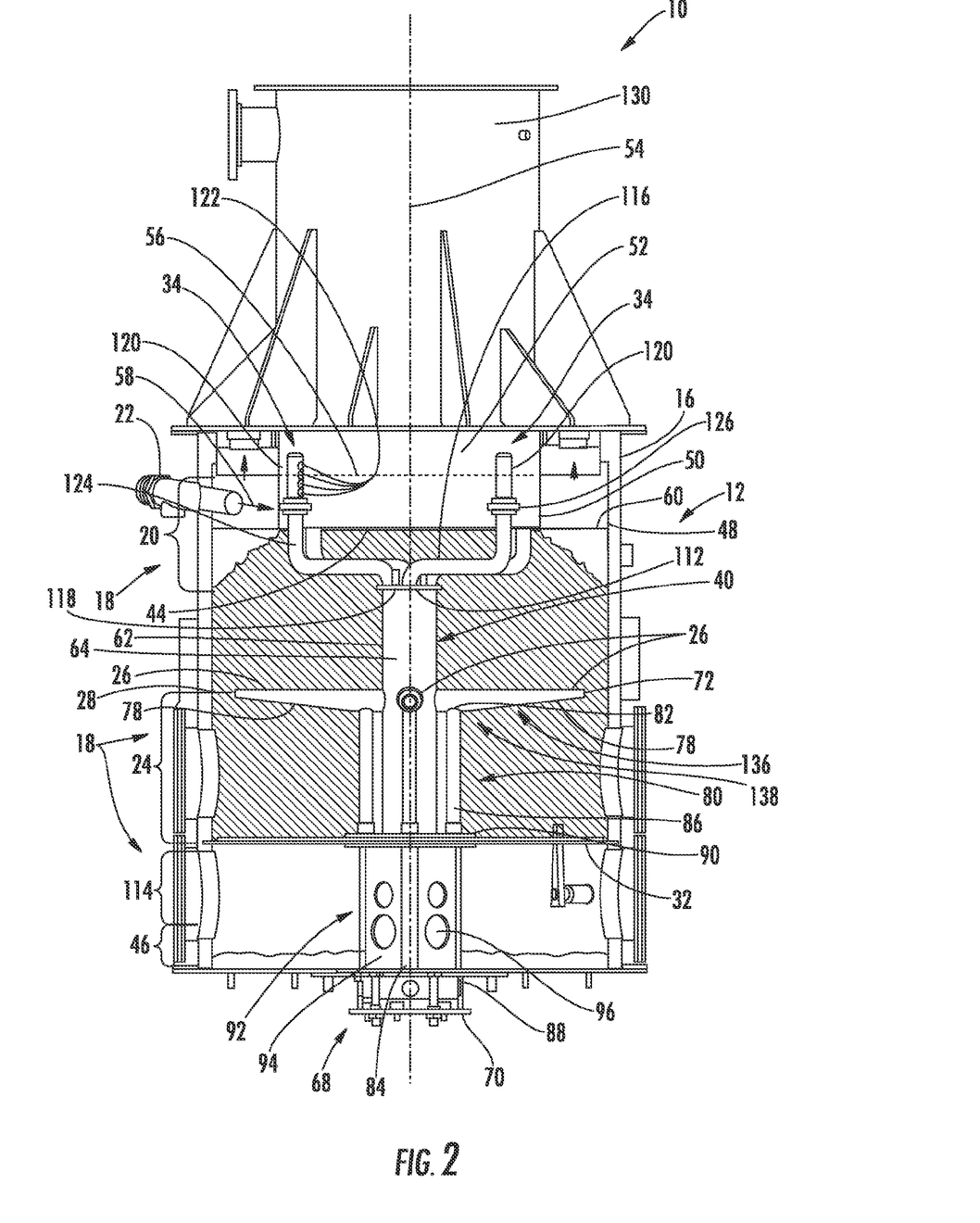
FIG. 2 is a partial cross-sectional front view of the reactor vessel of the plasma assisted gasification system.
Figure 3:
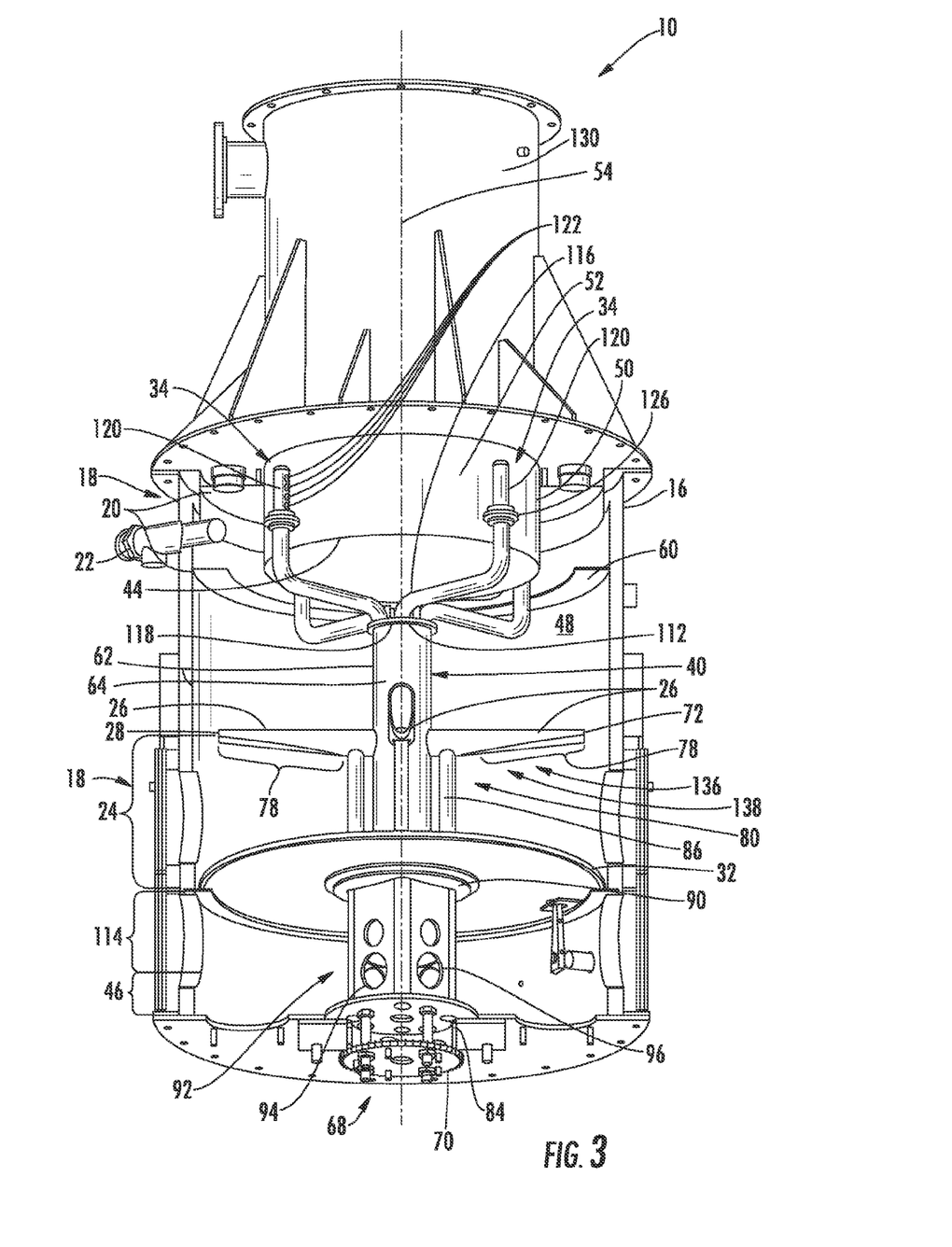
FIG. 3 is a partial cross-sectional upward viewing perspective view of the reactor vessel of the plasma assisted gasification system.
Figure 4:
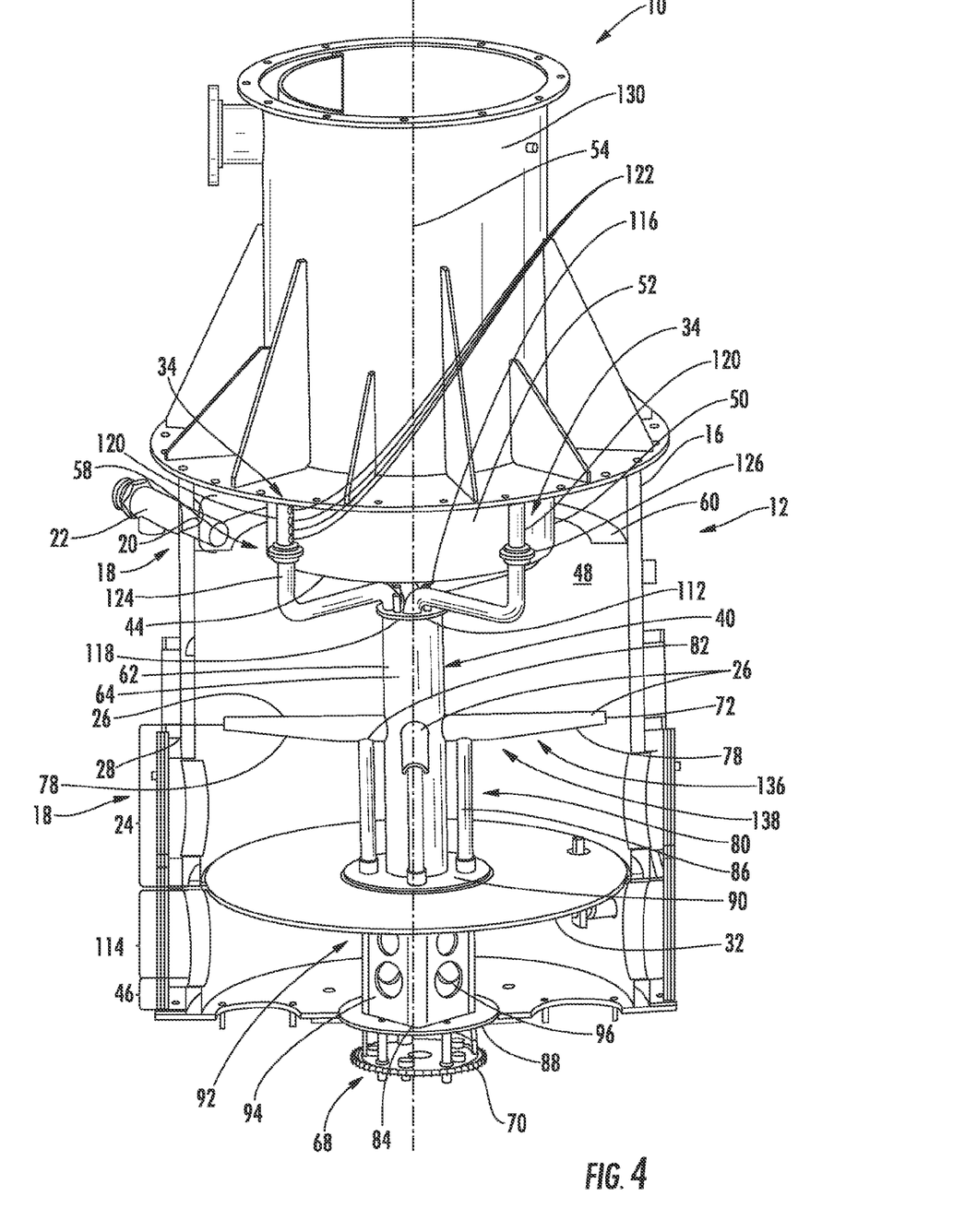
FIG. 4 is a partial cross-sectional downward viewing perspective view of the reactor vessel of the plasma assisted gasification system.

As shown in FIGS. 2-4, the plasma assisted gasification system 10 may include a reactor vessel 16 having at least one fuel inlet 44 and having distinct reaction zones 18, including, but not limited to, a pyrolysis reaction zone 20, a combustion reaction zone 24 and a carbon layer support 32. The pyrolysis reaction zone 20 may be positioned upstream of the combustion reaction zone 24, and the combustion reaction zone 24 may be positioned upstream of a carbon layer support 32. The pyrolysis reaction zone 20 may be positioned between an inner surface 48 of the reactor vessel 16, an outer surface 50 of a conduit 52, also referred to as a fuel hopper, forming the fuel inlet 44, and a surface of the fuel 142, as shown in FIG. 2. The pyrolysis reaction zone 20 may include at least one plasma torch 22. The pyrolysis reaction zone 20 may include a downstream shield 60 extending at least partially from an inner surface 48 of the reactor vessel 16 towards the conduit 52 forming the fuel inlet 44. The shield 60 prevents the fuel 142 from filing the pyrolysis reaction zone 20. The pyrolysis reaction zone 20 may be formed radially outward from the conduit 52 forming the fuel inlet 44. The combustion reaction zone 24 may be defined by at least one rotatable burner 26 on an upstream side 28 of the combustion reaction zone 24 such that the rotatable burner 26 is configured to rotate within the reactor vessel 16 to reduce the formation of burn channels in fuel 142 held in the reactor vessel 16. The use of the burners 26 define the combustion reaction zone 24. The reactor vessel 16 may also include an ash collection zone 46 positioned downstream from the carbon layer support 32.

As shown in FIGS. 2-4, the gasification system 10 may include one or more plasma torches 22 positioned within the pyrolysis reaction zone 20. The plasma torch 22 may be positioned in any appropriate position. In one embodiment, the plasma torch 22 may extend partially radially inward, and may be positioned nontangential and nonradial in a plane 56 orthogonal to a longitudinal axis 54 of the reactor vessel 16, and the plasma torch 22 may be positioned in a downstream direction nonparallel to the longitudinal axis 54, thereby forming a helical pathway 58 of pyrolysis gas, during use, within the fuel 142 contained in the reactor vessel 16. The plasma torch 22 may be positioned in a downstream direction nonparallel to the longitudinal axis 54 such that the plasma torch 54 may be positioned between about 5 degrees and 20 degrees from a plane orthogonal to the longitudinal axis 54 of the reactor vessel 16. In at least one embodiment, as shown in FIGS. 1-4, the gasification system 10 may include a plurality of plasma torches 22. The plasma torch 22 may be any appropriate plasma torch, such as, but not limited to, a burner with a flame temperature of at least about 1,300 degrees Celsius, such as but not limited to plasma burners. The ultraviolet emissions from the electrically charged flame helps to break up leftover hydrocarbons (tars) in the syngas exit region of the reactor vessel 16.

The combustion reaction zone 24 may be positioned downstream from the pyrolysis reaction zone 20 and may be defined by at least one rotatable burner 26 on an upstream side 28 of the combustion reaction zone 24 and on the downstream side by burned fuel 142 resting on the carbon support layer. The rotatable burner 26 may be configured to rotate within the reactor vessel 16 to reduce the formation of burn channels in fuel 142 held in the reactor vessel 16. In one embodiment, the gasification system 10 may include a plurality of rotatable burners that extend radially outward from an outer surface 62 of the conduit 64 forming a portion of the agitator drive assembly 40, which is described in more detail below.

The carbon layer support 32 may be positioned downstream from the combustion reaction zone 24. The carbon layer support 32 may be positioned upstream from an outer wall forming the reaction vessel 16 and defining the ash collection zone. The carbon layer support 32 may be formed from a porous material. In at least one embodiment, the carbon layer support 32 may be formed from grating, expanded metal, or other material having holes enabling ash to pass through the carbon layer support and collect in an ash collection zone 46 positioned downstream from the carbon layer support 32. The carbon layer support 32 may be formed from materials capable of withstanding the high temperature environment within the reactor vessel 16, the materials including, but not limited to, stainless steel, ceramics, cooled piping, or nickel-chromium based superalloys, such as, but not limited to, INCONEL.

The gasification system 10 may include a syngas cleaning system 138 for removing contaminants from the syngas before the syngas is passed downstream of the reactor vessel 16 to the engine 108. The syngas cleaning system 138 may be formed from a syngas recycler 136 positioned in the reactor vessel 16 for routing syngas together with contaminants from a region downstream of the carbon layer support 32 to the combustion reaction zone 24. The syngas recycler 136 may be formed from a syngas separation chamber 36 and at least one burner 26. The syngas separation chamber 36 may be positioned within the reactor vessel 16 to separate contaminants created during combustion in the combustion reaction zone 24 from the syngas.

Figure 5:
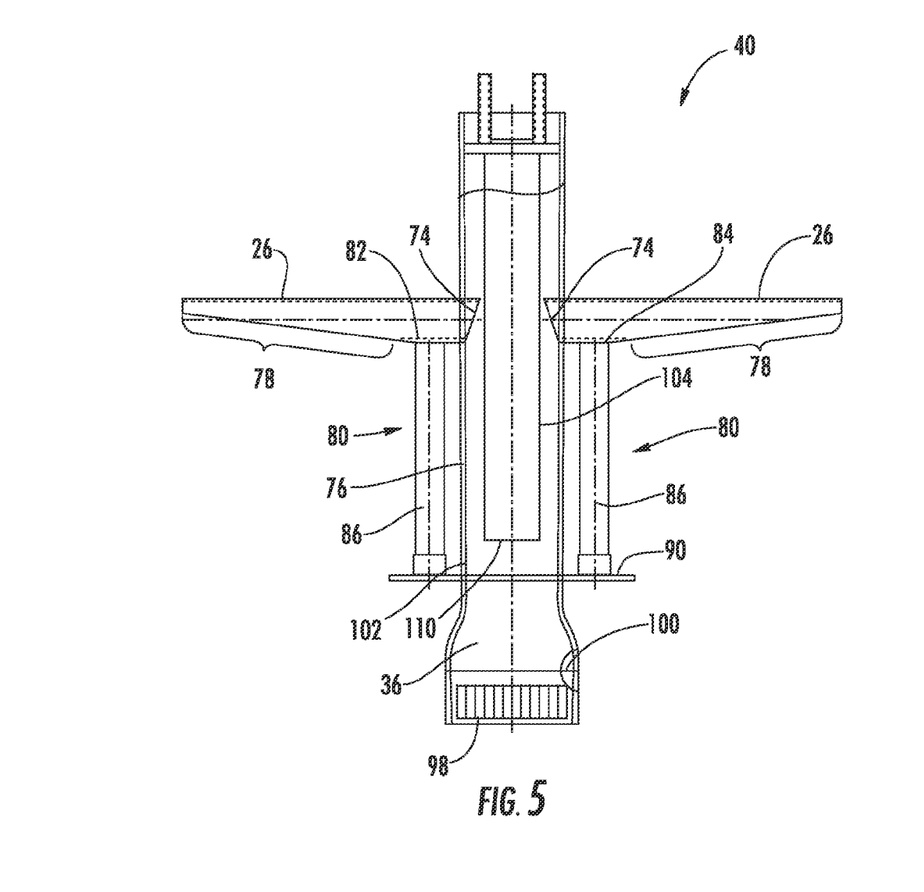
FIG. 5 is a partial cross-sectional front view of the agitator drive assembly.
Figure 6:
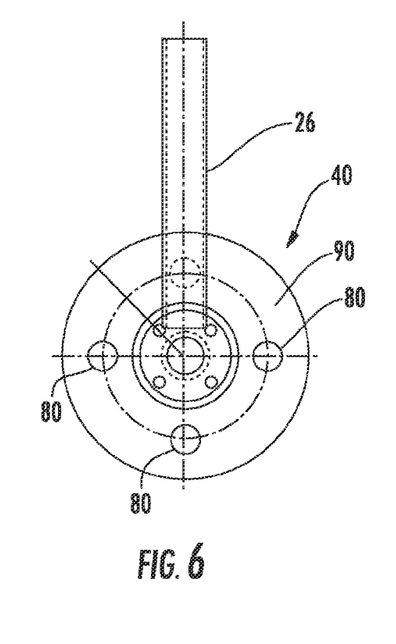
FIG. 6 is a partial top view of the agitator drive assembly.

The gasification system 10 may include an agitator drive assembly 40, as shown in FIGS. 2-4 and in detail in FIGS. 5 and 6, positioned in the reactor vessel 16, extending into the combustion reaction zone 24 and defining at least a portion of the combustion reaction zone 24 with at least one burner 26. A portion of the agitator drive assembly 40 may be formed from a conduit 64 that is hollow. The agitator drive assembly 40 may be rotatable, and in at least one embodiment, may be rotatable about the longitudinal axis 54 of the reactor vessel 16 to prevent the formation of burn channels in the fuel 142 in the reactor vessel 16. The agitator drive assembly 40 may include a drive gear 68 attached to a bottom portion of the agitator drive assembly 40. The drive gear 68 may include reduction gears 70 configured to drive the agitator drive assembly 40 at a rotational speed of less than about two revolutions per minute. The agitator drive assembly 40 may be driven by a motor, such as, but not limited to, an electric motor.

The agitator drive assembly 40 may include one or more burners 26, and in at least one embodiment, may include a plurality of burners 26. The burners 26 may extend radially outward from the outer surface 62 of the conduit 64 forming a portion of the agitator drive assembly 40. One or more of the plurality of burners 26 may be formed from a cylinder 72 having an inlet 74 positioned at an inner surface 76 or positioned radially inward from the inner surface 76 of the conduit 64 forming the portion of the agitator drive assembly 40. The burner 26 may include an outlet 78 formed from a diagonal cut through the cylinder 72, wherein the outlet 78 faces away from the pyrolysis reaction zone 20. In one embodiment, as shown in FIGS. 3 and 4, the agitator drive assembly 40 may be formed from four cylindrical burners 26 extending radially outward from the conduit 64 forming the portion of the agitator drive assembly 40. The agitator drive assembly 40 may include other number of burners 26 other than four burners 26.

The agitator drive assembly 40 may include one or more ambient air supplies 80 that includes an outlet 82 in fluid communication with at least one of the plurality of burners 26 upstream from the burner outlet 78. An inlet 84 of the ambient air supply 80 may be positioned outside of the reactor vessel 16 to draw ambient air into the system 10 as needed. As shown in FIGS. 2-6, the ambient air supply 80 may include one or more ambient air supplies 80 in direct fluid communication with each of the plurality of burners 26. In one embodiment, each ambient air supply 80 may be a conduit 86. The conduit 86 may extend from an outer sealing plate 88 through a carbon layer support seal plate 90 to each burner 26. The conduits 86 may form four corners of an turbine assembly 92. The conduits 86 may be coupled together with sidewalls 94 having one or more orifices 96. The conduits 86 may extend through at least a portion of the combustion reaction zone 24 thereby forming an ambient air preheater that preheats the air before it is discharged into the combustion reaction zone 24 for combustion.

As shown in FIG. 5, the gasification system 10 may include a syngas separation chamber 36 for separating combustion products, such as tar, from the syngas. In at least one embodiment, the gasification system 10 positioned in the hollow portion of the agitator drive assembly 40 may be configured to separate contaminants from syngas such that syngas with contaminants are passed into one or more burners 26. The syngas separation chamber 36 may be positioned downstream from the burners 26.

In addition, the gasification system 10 may include a centrifuge device, which may be, but is not limited to being, a turbine 98, as shown in FIGS. 5 and 7, positioned within a turbine housing 100 upstream from the syngas separation chamber 36. The turbine housing 100 may be positioned within the turbine assembly 92. During operation, the turbine 98 draws syngas through the orifices 96 in the sidewalls 94 forming the turbine assembly 92. When assembled, the orifices 96 may be positioned downstream of the carbon layer support 32 within the syngas collection chamber 114 of the ash collection zone 46. The turbine 98 may be configured to operate at any appropriate speed and may be driven with motor, such as, but not limited to, an electric motor or a hydraulic motor. In at least one embodiment, the turbine 98 may operate between 10,000 revolutions per minute (rpm) and 30,000 rpm. The turbine 98 may have any appropriate configuration with any appropriate number of blades. The turbine 98 may be cooled, as appropriate, and in at least one embodiment, may be oil cooled. The turbine assembly 92 may be formed from a plurality of sidewalls 94 forming a chamber that extends from the carbon layer support 32 to the outer seal plate 88 positioned at the reactor vessel 16. The sidewalls 94, as shown in FIGS. 2-4, may include one or more orifices 96 acting as inlets to the turbine 98. During operation, use of the turbine 98 separates syngas from contaminants in the syngas, such as, but not limited to, dust and tar, such that the contaminants are located near an outer wall 102 defining the syngas separation chamber 36 and relatively uncontaminated syngas is located closer to a longitudinal axis 54 of the syngas separation chamber 36. Removal of the dust and tar from the syngas prevents the dust from becoming molten in the pyrolysis reaction zone 20 and causing a problem in the engine 108 and the syngas filter 106. During use, the turbine 98 may also provide a boost of about 2-5 pounds per square inch (psi) to the syngas stream. The turbine 98 may create a multiplying effect on the reactor vessel 16.

A syngas exhaust conduit 104 may be positioned within the agitator drive assembly 40 to pass syngas having been cleaned in the syngas separation chamber 36 downstream to a syngas filter 106 and on to an engine 108. The syngas exhaust conduit 104 may have an inlet 110 positioned upstream from an inlet 74 to the burner 26, whereby the inlet 110 to the syngas exhaust conduit 104 may be positioned radially inward from inner walls forming the syngas separation chamber 36 and the inlet 74 to the burner 26 may be positioned radially outward from the syngas exhaust conduit 104. In such as position, syngas pulled through the turbine 98 is exhausted downstream and contaminants are centrifuged out. As such, the high rotational velocity of the syngas that passed through the turbine 98 causes combustion byproducts, such as dust and tar, to be collected alongside the inner surface of the wall forming the syngas separation chamber 36. The clean syngas located relatively close to the longitudinal axis 54 of the syngas separation chamber 36 flows into the syngas exhaust conduit 104, and the syngas together with the combustion byproduct, tar, are passed into the inlets 74 of the burners 26.

As shown in FIGS. 2-4, the gasification system 10 may include one or more syngas heaters 34 for heating the syngas before it reaches the engine 108. In one embodiment, the agitator drive assembly 40 may include one or more syngas heaters 34 with an inlet 112 in fluid communication with the syngas collection chamber 114 of the ash collection zone 46. The syngas heater 34 may be configured to heat the syngas before the syngas is passed to the engine 108 to increase the efficiencies of the system 10. In at least one embodiment, the syngas heater 34 may be positioned in the pyrolysis reaction zone 20 such that heat from the pyrolysis reaction zone 20 heats syngas flowing through the syngas heater 34. The syngas heater 34 may be formed from one or more conduits 116 in direct fluid communication with the syngas collection chamber 114. The conduit 116 may extend from the syngas collection chamber 114 through the carbon layer support 32, through the combustion reaction zone 24 and into the pyrolysis reaction zone 20. As shown in FIGS. 2-4, the conduit 116 may extend from an end 118 of the syngas exhaust conduit 104.

As shown in FIGS. 2-4, the conduit 116 forming the syngas heater 34 may be formed from a conduit 116 that is positioned, at least in part, radially outward from the fuel inlet conduit 52 forming at least a portion of the fuel inlet 44 of the reactor vessel 16. The conduit 116 forming the syngas heater 34 may have one or more outlets 120 in the pyrolysis reaction zone 20, and, in at least one embodiment, the conduit 116 forming the syngas heater 34 may have a plurality of outlets 120 in the pyrolysis reaction zone 20. As shown in FIGS. 2-4, the outlets 120 in the pyrolysis reaction zone 20 may be formed from a plurality of exhaust orifices 122 positioned in each of the outlets 120. As such, syngas is exhausted into the pyrolysis reaction zone 20 before being passed on to the engine 108. The conduit 116 may be formed from one or more exhaust conduits 124 having a support bearing 126 that bears on an outer surface 50 of the fuel inlet conduit 52 forming at least a portion of the fuel inlet 44 of the reactor vessel 16. The exhaust conduit 124 may be formed from a plurality of exhaust conduits 124, each extending radially outward with an axially extending portion having a support bearing 126 that bears on the outer surface 50 of the fuel inlet conduit 52. In at least one embodiment, the plurality of exhaust conduits 124 form four exhaust conduits 124 extending radially outward from a central conduit, which may be, but is not limited to being, the syngas exhaust conduit 104, wherein the four exhaust conduits 124 are equally spaced from each other or positioned in another configuration.

As shown in FIGS. 9 and 10, the gasification system 10 may be a modular system housed within a frame 14 facilitating relatively easy transportation. The frame 14 may have any appropriate configuration necessary to facilitate transportation of the system 10 from a manufacturing site to an on-site location and between usage sites. The frame 14 may be configured to form a trailer upon which at least a portion of the system 10 or the entirety of the system 10 may be housed. In at least one embodiment, the frame 14 may be a trailer sized and constructed in conformity with applicable laws such that the trailer may be pulled on the roadways. In at least one embodiment, components of the system 10, including the reactor vessel 16, the engine 108, the generator 128, and the syngas filter 106 may be positioned on the frame 14 such that when the system 10 is positioned in a stowed position, as shown in FIG. 9, the components of the system 10 are contained within the frame 14 such that the frame 14 may be towed on a highway without components in risk of being destroyed. The frame 14 may also be inserted into a fully enclosed shipping container. In at least one embodiment, the frame 14, in a stowed position, may have outer dimensions less than inner dimensions of standard 40 foot shipping container and therefore, may be configured to fit within a 40 foot long shipping container. As such, the system 10 may be shipped over land, rail, sea, air and air dropped to any destination. Such mobility enables the system 10 to be built in quality controlled facilities and shipped to the destination of choice for use, thereby enabling power to be made available to desolate locations throughout the world. Such mobility of the system 10 could make it possible to make significant progress towards supplying cost efficient power to villages, desolate populations and third world countries.

The system 10 may also include an electric generator 128 in communication with the engine 108 and configured to generate electricity from a rotating drive shaft of the engine 108. The generator 128 may have be any appropriate generator and may be sized based on the power demands, the size of the reactor vessel 16 and other appropriate factors. The engine 108, which may be, but is not limited to being, a turbine engine and a diesel engine, may operate at least partially on the syngas supplied by the syngas separation chamber 36. The electric generator 128 may be in communication with the engine 108 and configured to generate electricity from rotating components, such as the drive shaft, of the engine 108.

As shown in FIGS. 1-4, the gasification system 10 may include a fuel dryer 130 in communication with and positioned upstream from the reactor vessel 16. In particular, the fuel dryer 130 may be positioned upstream from the fuel inlet 44 to the reactor vessel 16. The heat source may be exhaust gases from the engine 108. In particular, an exhaust gas inlet 132 in the dryer 130 places exhaust from the engine 108 in fluid communication with the fuel dryer 130 such that exhaust gases may be passed to the dryer 130 to dry the fuel 142. As such, the fuel inlet 44 to the reactor vessel 16 may be sealed with fuel 142 and exhaust gases from the engine 108 sealing off the possible leakage of outside air with oxygen into the reactor vessel 16 through the fuel inlet 44. In particular, exhaust gases may be passed into the fuel 142 contained within the fuel dryer 130, and together the exhaust flowing upstream through the fuel 142 positioned in the dryer 130 forms a dynamic seal for the gasification system 10. Thus, a conventional rigid seal is no longer required and fuel 142 may be more easily supplied to the gasification system 10 via hand or automated system without the use of an airlock.

The automated fuel delivery system may be formed from one or more systems having sensors that determine whether fuel contained within the fuel conduit 52 is within acceptable levels. If not, appropriate correction is made to add fuel into the fuel conduit 52. The fuel level may be monitored continuously, periodically, or at random time periods. The gasification system 10 may also include a fuel shredder 134 in communication with and positioned upstream from the fuel dryer 130. The fuel shredder 134 may be any appropriate device configured to shred fuel. The gasification system 10 may include multiple fuel shredders 134, whereby at least some of the fuel shredders 134 may be adapted for use with different type of fuels, such as rubbish, tires, wood chips and the like.

The gasification system 10 may also include one or more syngas filters 106 in fluid communication with the plasma assisted gasification reaction chamber 16 and positioned downstream from the carbon layer support 32. The syngas filter 106 may be formed from a water based scrubber that quickly quenches the syngas after formation to limit the formation of NOx.

During use, the gasification system 10 may be transported to a usage site, as shown in the exemplary site plan in FIG. 8. The gasification system may be shipped via transportation modes, including, but not limited to, truck, trailer, rail, air or ship. The gasification system 10 may also be airdropped into remote locales where delivery by land or sea based transportation modes are not feasible. The gasification system 10 may be tilted from a stowed position, as shown in FIG. 9, into an operating position, as shown in FIG. 10. Due to the weight of the gasification system 10, the gasification system 10 should be placed over a pad, such as a concrete slab, with sufficient footer support to provide an adequate foundation upon which the gasification system may be operated.

During start-up of the gasification system 10, shredded fuel is placed into the fuel dryer 130. The fuel may be, but is not limited to, rubbish, household waste, industrial waste, tires, and wood chips and liquid or gasious fuels may be injected into the pyrolysis reaction zone 20 or mixed with other fuels before being inputted into the reactor vessel 16. In some situations, shredded fuel may be provided, thereby eliminating the need to shred the fuel before use. The diesel engine 108 may be run on diesel fuel at idle speed for about five to ten minutes to warm-up after which the diesel engine 108 may be run at operating speed and may generate electricity using the generator 128. With electricity being generated, the plasma torches 22 may be fired up. Additionally, the control systems and other subsystems of the gasification system 10, such as, but not limited to, the turbine 98 and the agitator drive assembly 40, may be fired. As the diesel engine 108 is operating, exhaust from the diesel engine 108 is routed to the fuel dryer 130 to begin to dry the fuel. The reactor vessel 16 is heated with the plasma torches 22. As the reactor vessel 16 and plasma torches 22 heat up, pyrolysis gas and steam begin to form and may be routed through the syngas filter 106 and burned off using a flare 140. The flare 140 may be fueled with any appropriate fuel, such as, but not limited to, propane, diesel fuel, a combination of both fuels, another fuel source or a combination of these listed fuels and other fuels. Once the chamber within the reactor vessel 16 is hot enough to generate usable syngas, the flared gas being burned in the flare 140 will ignite, thereby producing a larger flame at the flare 140, which acts as a visual indicator. Such an increase in the size of the flare 140 is an indication that the syngas can be used in a diesel engine 108. The diesel engine 108 may be syncronized to an external power grid or switched onto an external power load. The desired power level may be set.

During operation, the content of oxygen in the engine exhaust gas should be no more than two percent. Controlling the oxygen percentage in the exhaust gas controls the syngas production in the reactor vessel 16. The flow of syngas to the flare 140 may be cutoff and rerouted to the fuel intake of the diesel engine 108 by closing a valve to the flare 140 and opening a valve to the fuel intake of the diesel engine 108. If the generator 128 operates under full load and only on diesel fuel, the governor of the diesel engine 108 should cut back diesel consumption to approximately ten percent of the original consumption. The desired power level may be established using a syngas valve. The fuel level in the fuel dryer 130 may be monitored visually, with sensors or other appropriate method, and fuel may be added as needed with automated or manual systems.

During operation, temperature levels, pressure levels, water supply and oil supply may be monitored. Bearing grease and oil may be supplied to a drive bearing on the agitator drive assembly 40. The temperature of the fuel dyer 130 may be set with a diesel engine exhaust bypass valve. The preheat temperature and the temperature in the pyrolysis reaction zone 20 can be set by a reactor preheat valve in an exhaust bypass chamber. The height of the carbon layer formed on the carbon layer support 32 may be adjusted using a carbon layer control 140. In at least one embodiment, the carbon layer control 140 may be formed from one or more agitating devices, such as a hinge arm, for shaking the carbon layer support 32 such that ash can fall through the carbon layer support 32 and collect in the ash collection zone 46. The ash may be removed from the ash collection zone 46 when necessary through one or more valves enabling ash to be removed without creating unregulated flow of ambient air into the ash collection zone 46.

The gasification system 10 may be shutdown by first allowing all of the fuel in the fuel inlet conduit 52 to be used in the reactor vessel 16 without replenishing the fuel. In at least one embodiment, this entails ceasing the deposit of fuel in the fuel inlet conduit 52 about 90 minutes before the desired shutdown time. As syngas production ceases, the diesel fuel consumption will increase as regulated by the governor on the diesel engine. When syngas delivery is too low for desired operation, the electricity and fuel to the plasma torches 22 may be shutoff, and the load from the generator may be disconnected. The diesel engine 108 may be operated at idle until the reactor vessel 16 is burned clean, and the reactor temp drops to about 300 degrees Celsius. All cooling systems within the gasification system 10 should be operated until the reactor vessel 16 is cold to prevent damage. Filters may be replaced as needed.

It will be understood that the invention is not limited to the specific details described herein, which are given by way of example only, and that various modifications and alterations are possible within the scope of the invention as defined in the following claims.

I claim:

1. A controlled zone gasification reactor for a plasma assisted gasification reaction system, comprising:
    a reactor vessel, comprising:
        at least one fuel inlet;
        a pyrolysis reaction zone positioned between an inner surface of the reactor vessel and an outer surface of a conduit forming a fuel inlet, wherein the pyrolysis reaction zone includes at least one plasma torch;
        a combustion reaction zone defined by at least one rotatable burner on an upstream side of the combustion reaction zone, wherein the rotatable burner is configured to rotate within the reactor vessel to reduce the formation of burn channels in fuel held in the reactor vessel;
        a carbon layer support, wherein the pyrolysis reaction zone is positioned upstream of the combustion reaction zone, and the combustion reaction zone is positioned upstream of the carbon layer support; and
        an ash collection zone positioned downstream from the carbon layer support.

2. The controlled zone gasification reactor of claim 1, further comprising a dryer with an internal chamber configured to dry fuel, wherein the dryer is positioned upstream from the fuel inlet to the reactor vessel and an exhaust gas inlet in the dryer that places an exhaust from an engine in fluid communication with the dryer such that exhaust gases may be passed to the dryer to dry the fuel, wherein at least one fuel inlet to the reactor vessel is sealed with fuel and exhaust gases from the engine.

3. The controlled zone gasification reactor of claim 1, wherein the at least one plasma torch extends partially radially inward and positioned nontangential and nonradial in a plane orthogonal to a longitudinal axis of the reactor vessel, and the plasma torch is positioned in a downstream direction nonparallel to the longitudinal axis, thereby, during use, forming a helical pathway of pyrolysis gas within the fuel contained in the reactor vessel.

4. The controlled zone gasification reactor of claim 3, wherein the plasma torch is positioned in a downstream direction nonparallel to the longitudinal axis such that the plasma torch is positioned between about 5 degrees and 20 degrees from a plane orthogonal to the longitudinal axis of the reactor vessel.

5. The controlled zone gasification reactor of claim 1, wherein the pyrolysis reaction zone further comprises a downstream shield extending radially inward at least partially from an inner surface of the reactor vessel towards the conduit forming the fuel inlet.

6. The controlled zone gasification reactor of claim 1, wherein the at least one rotatable burner comprises a plurality of burners that extend radially outward from an outer surface of the conduit forming a portion of an agitator drive assembly.

7. The controlled zone gasification reactor of claim 6, wherein at least one of the plurality of burners is formed from a cylinder having an inlet positioned radially inward from an inner surface of the conduit forming the hollow portion of the agitator drive assembly.

8. The controlled zone gasification reactor of claim 6, wherein the at least one burner formed from the cylinder includes an outlet formed from a diagonal cut through the cylinder, wherein the outlet faces away from the pyrolysis reaction zone.

9. The controlled zone gasification reactor of claim 8, wherein the plurality of burners are formed from four cylindrical burners extending radially outward from the conduit forming the portion of the agitator drive assembly.

10. The controlled zone gasification reactor of claim 1, further comprising at least one ambient air supply with an outlet in direct fluid communication with at least one of the plurality of burners upstream from the burner outlet.

11. The plasma assisted gasification reaction chamber of claim 10, wherein the at least one ambient air supply comprises at least one ambient air supply in direct fluid communication with each of the plurality of burners.

12. The plasma assisted gasification reaction chamber of claim 10, wherein the at least one ambient air supply extends from at least one of the plurality of burners, past the carbon layer support and past a wall forming a portion of the reactor vessel.

13. The plasma assisted gasification reaction chamber of claim 10, wherein the at least one ambient air supply extends through at least a portion of the combustion zone thereby forming an ambient air preheater.

14. A controlled zone gasification reactor for a plasma assisted gasification reaction system, comprising:
a reactor vessel, comprising:
at least one fuel inlet;
a pyrolysis reaction zone positioned between an inner surface of the reactor vessel and an outer surface of a conduit forming a fuel inlet, wherein the pyrolysis reaction zone includes at least one plasma torch;
a combustion reaction zone defined by at least one rotatable burner on an upstream side of the combustion reaction zone, wherein the rotatable burner is configured to rotate within the reactor vessel to reduce the formation of burn channels in fuel held in the reactor vessel;
a carbon layer support, wherein the pyrolysis reaction zone is positioned upstream of the combustion reaction zone, and the combustion reaction zone is positioned upstream of the carbon layer support;
an ash collection zone positioned downstream from the carbon layer support; and
at least one ambient air supply with an outlet in direct fluid communication with at least one of the plurality of burners upstream from the burner outlet;
wherein the at least one plasma torch extends partially radially inward and positioned nontangential and nonradial in a plane orthogonal to a longitudinal axis of the reactor vessel, and the plasma torch is positioned in a downstream direction nonparallel to the longitudinal axis, thereby, during use, forming a helical pathway of pyrolysis gas within the fuel contained in the reactor vessel.

15. The controlled zone gasification reactor of claim 14, further comprising a dryer with an internal chamber configured to dry fuel, wherein the dryer is positioned upstream from the fuel inlet to the reactor vessel and an exhaust gas inlet in the dryer that places an exhaust from an engine in fluid communication with the dryer such that exhaust gases may be passed to the dryer to dry the fuel, wherein at least one fuel inlet to the reactor vessel is sealed with fuel and exhaust gases from the engine.

16. The controlled zone gasification reactor of claim 14, wherein the plasma torch is positioned in a downstream direction nonparallel to the longitudinal axis such that the plasma torch is positioned between about 5 degrees and 20 degrees from a plane orthogonal to the longitudinal axis of the reactor vessel.

17. The controlled zone gasification reactor of claim 14, wherein the pyrolysis reaction zone further comprises a downstream shield extending radially inward at least partially from an inner surface of the reactor vessel towards the conduit forming the fuel inlet.

18. The controlled zone gasification reactor of claim 14, wherein the at least one rotatable burner comprises a plurality of burners that extend radially outward from an outer surface of the conduit forming a portion of an agitator drive assembly.

19. The controlled zone gasification reactor of claim 18, wherein at least one of the plurality of burners is formed from a cylinder having an inlet positioned radially inward from an inner surface of the conduit forming the hollow portion of the agitator drive assembly.

20. The controlled zone gasification reactor of claim 18, wherein the at least one burner formed from the cylinder includes an outlet formed from a diagonal cut through the cylinder, wherein the outlet faces away from the pyrolysis reaction zone.

21. The controlled zone gasification reactor of claim 20, wherein the plurality of burners are formed from four cylindrical burners extending radially outward from the conduit forming the portion of the agitator drive assembly.

22. The plasma assisted gasification reaction chamber of claim 14, wherein the at least one ambient air supply extends through at least a portion of the combustion zone thereby forming an ambient air preheater.

* * * * *